United States Patent
Gibbs et al.

(10) Patent No.: US 9,754,514 B2
(45) Date of Patent: Sep. 5, 2017

(54) ADJUSTABLE FRICTION JOINT ASSEMBLY FOR CRASH TEST DUMMY

(71) Applicant: Humanetics Innovative Solutions, Inc., Plymouth, MI (US)

(72) Inventors: Joseph Gibbs, Birmingham, MI (US); Zhenwen J. Wang, Northville, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 372 days.

(21) Appl. No.: 14/496,046

(22) Filed: Sep. 25, 2014

(65) Prior Publication Data

US 2015/0086957 A1     Mar. 26, 2015

Related U.S. Application Data

(60) Provisional application No. 61/882,466, filed on Sep. 25, 2013.

(51) Int. Cl.
*G09B 23/32*     (2006.01)

(52) U.S. Cl.
CPC ....... *G09B 23/32* (2013.01); *Y10T 403/32418* (2015.01)

(58) Field of Classification Search
CPC ........ G09B 23/30; G09B 23/32; G09B 23/34; A61F 13/085; A47C 31/085; G01M 17/0078

See application file for complete search history.

(56) References Cited

U.S. PATENT DOCUMENTS

| | | | |
|---|---|---|---|
| 3,762,069 A | 10/1973 | Culver | |
| 4,235,025 A | 11/1980 | Kortge | |
| 4,261,113 A | 4/1981 | Alderson | |
| 4,276,032 A | 6/1981 | Woley et al. | |
| 4,349,339 A * | 9/1982 | Daniel | G09B 23/32 434/274 |
| 4,579,558 A | 4/1986 | Ramer | |
| 5,180,086 A | 1/1993 | Ikeda | |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,741,989 A | 4/1998 | Viano et al. | |

(Continued)

FOREIGN PATENT DOCUMENTS

| EP | 2305078 A1 | 4/2011 |
|---|---|---|
| WO | 2009101200 A1 | 8/2009 |

*Primary Examiner* — Timothy A Musselman
(74) *Attorney, Agent, or Firm* — Howard & Howard Attorneys PLLC

(57) ABSTRACT

An adjustable friction joint assembly for a crash test dummy includes a first joint member for connection to a first member of the crash test dummy and a second joint member for connection to a second member of the crash test dummy. The adjustable friction joint assembly also includes a shaft operatively connected to the first joint member and the second joint member to allow rotation therebetween. The adjustable friction joint assembly further includes an adjustable friction assembly operatively connected to the shaft and operatively cooperating with the first joint member and the second joint member to adjust a friction tightness of the joint assembly.

14 Claims, 8 Drawing Sheets

(56) References Cited

U.S. PATENT DOCUMENTS

| | | | |
|---|---|---|---|
| 6,257,895 B1 * | 7/2001 | Oestreich | G09B 23/34 434/263 |
| 6,659,315 B2 | 12/2003 | Talaric et al. | |
| 6,982,409 B2 | 1/2006 | Huang et al. | |
| 7,021,989 B2 | 4/2006 | Wai | |
| 7,044,926 B2 | 5/2006 | Carlson | |
| 7,086,273 B2 | 8/2006 | Lipmyer | |
| RE42,418 E | 6/2011 | Lipmyer | |
| 8,407,033 B2 | 3/2013 | Cooper et al. | |
| 8,622,748 B2 | 1/2014 | Wang et al. | |
| 8,684,783 B2 | 4/2014 | Ehrsam | |
| 8,840,404 B2 | 9/2014 | Arthur et al. | |

* cited by examiner

ADJUSTABLE FRICTION JOINT ASSEMBLY FOR CRASH TEST DUMMY

CROSS-REFERENCE TO RELATED APPLICATION(S)

The present invention claims the priority date of U.S. Provisional Patent Application Ser. No. 61/882,466, filed Sep. 25, 2013.

GOVERNMENT RIGHTS IN THE INVENTION

The invention was made with government support under Government contract number W911QX-12-C-0015 awarded by the Department of the Army. The government has certain rights in the invention.

BACKGROUND OF THE INVENTION

1. Field of the Invention

The present invention relates generally to crash test dummies and, more particularly, to an adjustable friction joint assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic test devices, better known as "crash test dummies", to estimate a human's injury risk. The dummy must possess the general mechanical properties, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly, rib cage assembly, pelvis assembly, right and left arm assemblies, and right and left leg assemblies. These assemblies may be connected together through a joint or portions of these assemblies may be connected together through a joint.

One disadvantage of a current joint is that the only indicator as to the tightness is operator feel, leading to novice operators frequently over tightening. Another disadvantage of the current joint is that it has a very small contact area to generate friction and can loosen with movement of the joint. Yet another disadvantage of the current joint is that it only applies to a particular type of joint such as a knee joint of a crash test dummy. Thus, there is a need in the art for a joint assembly that has sufficient joint friction and can be applied to other joints beside the knee of the crash test dummy.

SUMMARY OF THE INVENTION

Accordingly, the present invention is an adjustable friction joint assembly for a crash test dummy. The adjustable friction joint assembly includes a first joint member for connection to a first member of the crash test dummy and a second joint member for connection to a second member of the crash test dummy. The adjustable friction joint assembly also includes a shaft operatively connected to the first joint member and the second joint member to allow rotation therebetween. The adjustable friction joint assembly further includes an adjustable friction assembly operatively connected to the shaft and operatively cooperating with the first joint member and the second joint member to adjust a friction tightness of the joint assembly.

In addition, the present invention is a crash test dummy including a body and at least one assembly operatively attached to the body. The crash test dummy also includes a joint assembly operatively attached to the body and the at least one assembly. The joint assembly includes a first joint member connected to the body and a second joint member connected to the at least one assembly. The joint assembly also includes a shaft operatively connected to the first joint member and the second joint member to allow rotation therebetween. The joint assembly further includes an adjustable friction assembly operatively connected to the shaft and operatively cooperating with the first joint member and the second joint member to adjust a friction tightness of the joint assembly.

One advantage of the present invention is that a new adjustable friction joint assembly is provided for a crash test dummy. Another advantage of the present invention is that the adjustable friction joint assembly provides increased sensitivity with respect to a tightness of the joint. Yet another advantage of the present invention is that the adjustable friction joint assembly provides a visual feedback to approximately locate a "1 g" setting. Still another advantage of the present invention is that the adjustable friction joint assembly provides resistance to loosening by pins. Still another advantage of the present invention is that the adjustable friction joint assembly is a mechanical adjustment for adjusting a tightness of the joint on a crash test dummy. A further advantage of the present invention is that the adjustable friction joint assembly provides friction adjustment for tightness of the joint on a crash test dummy. Still a further advantage of the present invention is that the adjustable friction joint assembly can be used not only for the knee joint, but can be used for other joints of the crash test dummy. Yet still a further advantage of the present invention is that the adjustable friction joint assembly provides for loosening of the joint during setup by the addition of pins which prevent relative rotation between a tapped hole (center of the joint) and friction adjustment, and a top plate giving visual feedback as to the tightness of the joint when its top face is flush with the top face of a housing.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
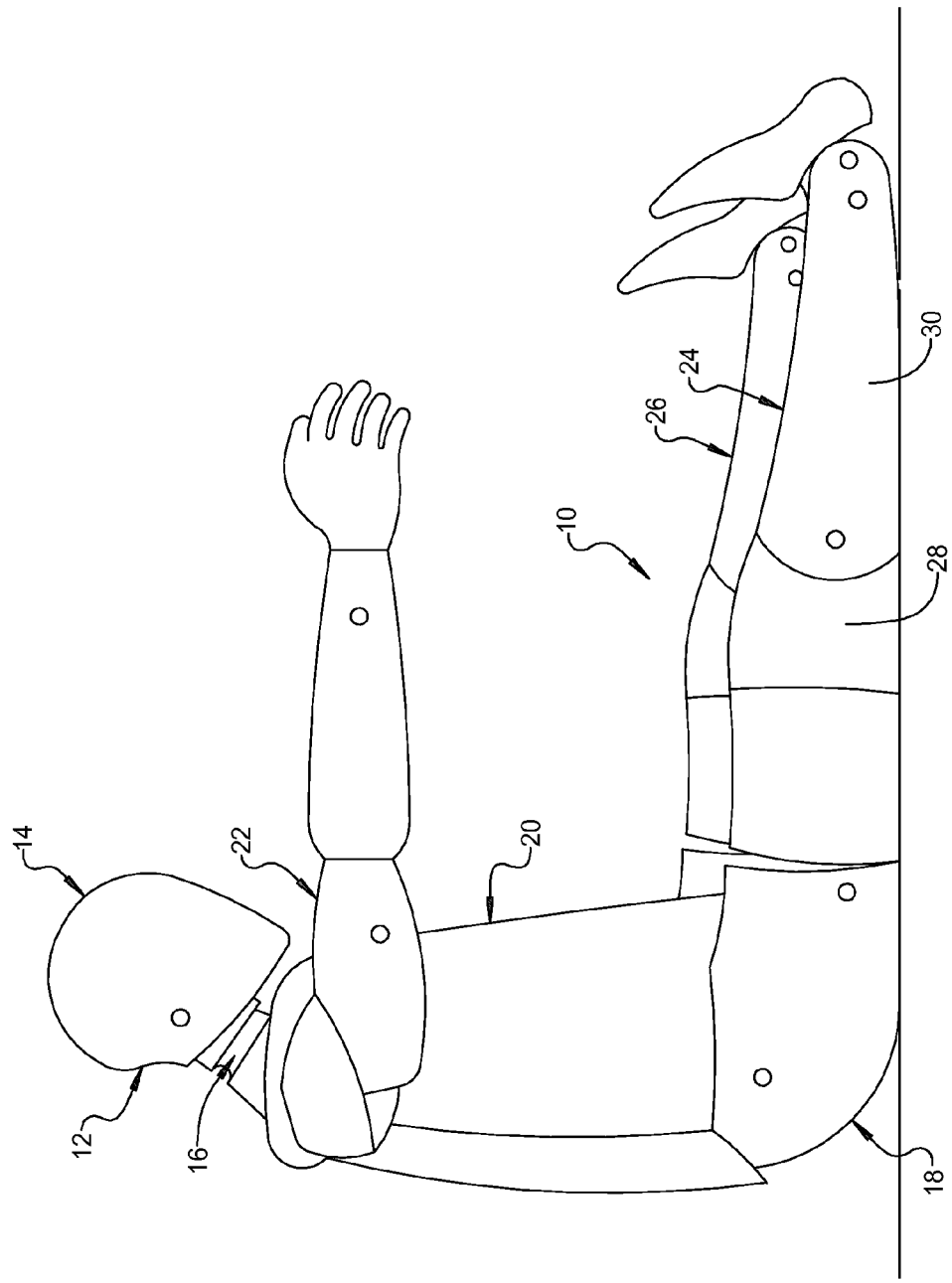
FIG. 1 is a side view of one embodiment of an adjustable friction joint assembly, according to the present invention, illustrated in operational relationship with a crash test dummy.
Figure 2:
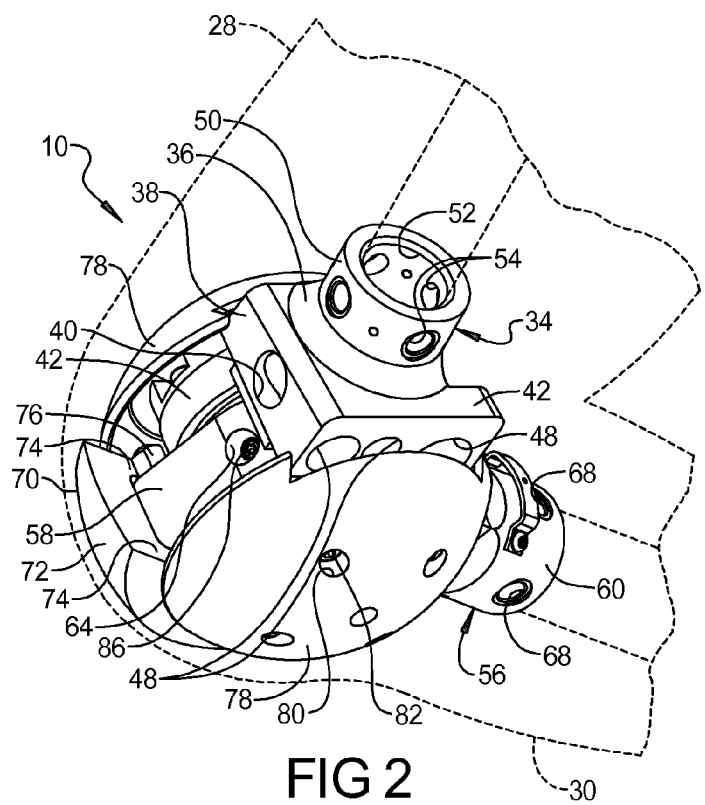
FIG. 2 is a perspective view of the adjustable friction joint assembly illustrated in operational relationship with a portion of the crash test dummy of FIG. 1.
Figure 3:
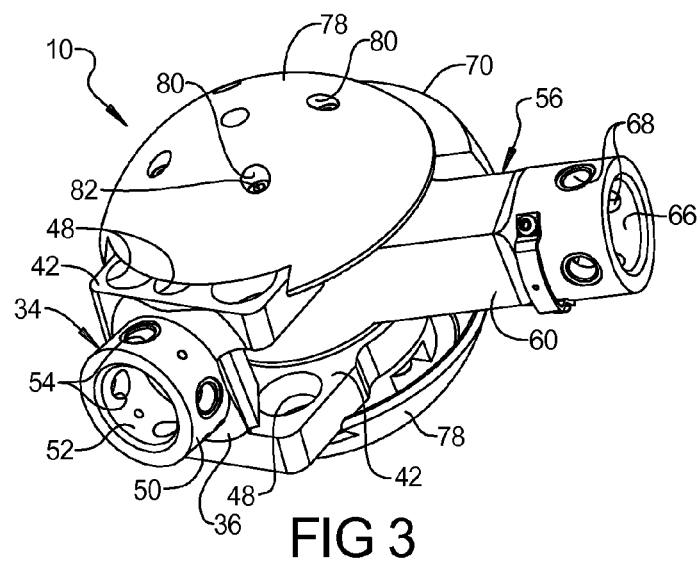
FIG. 3 is another perspective view of the adjustable friction joint assembly of FIG. 2.
Figure 4:
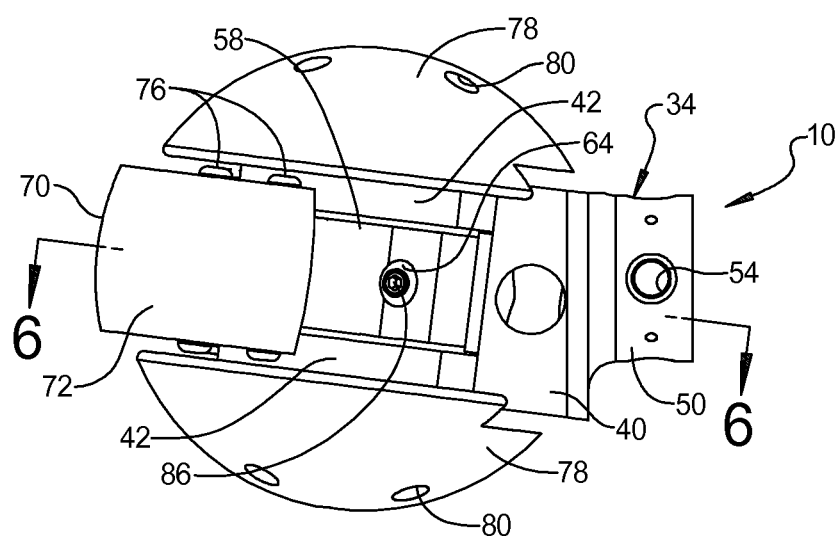
FIG. 4 is a top view of the adjustable friction joint assembly of FIG. 2.
Figure 5:
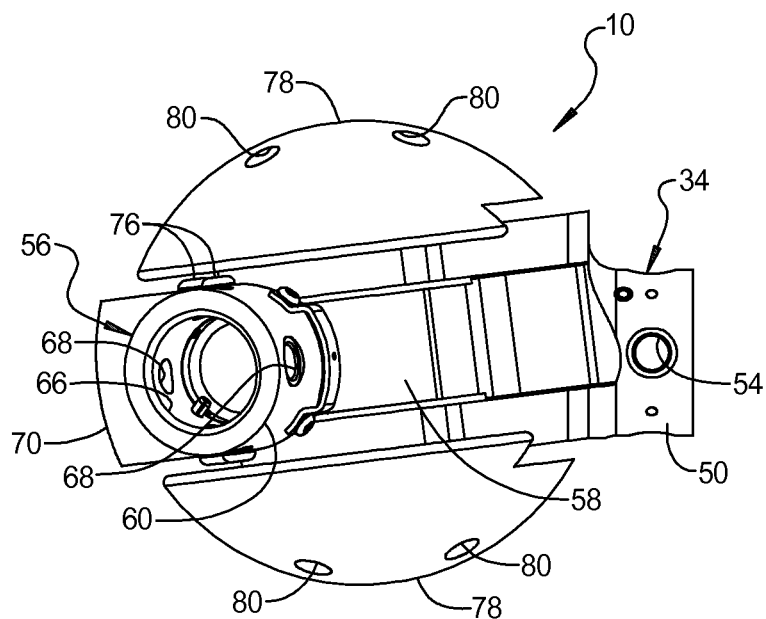
FIG. 5 is a bottom view of the adjustable friction joint assembly of FIG. 2.
Figure 6:
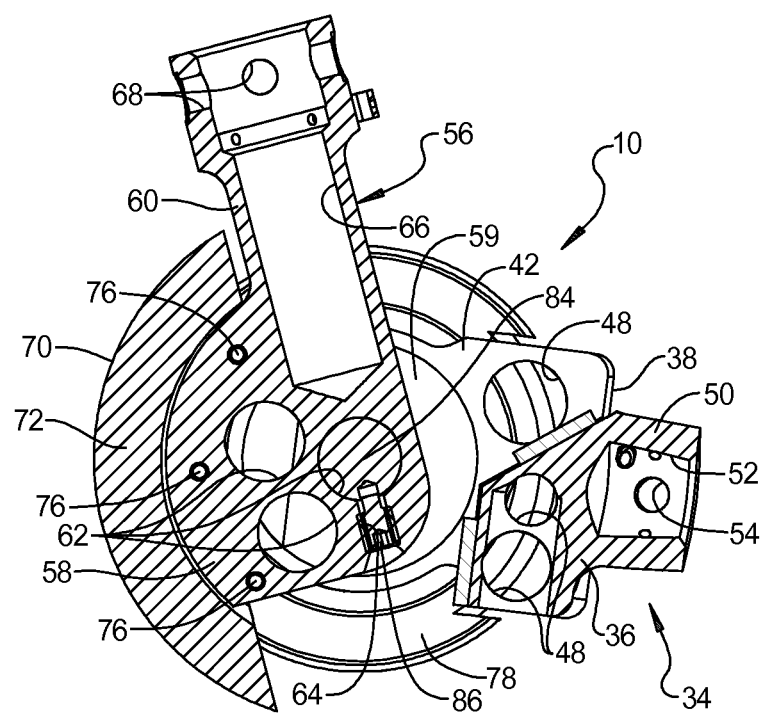
FIG. 6 is a sectional view taken along line 6-6 of FIG. 4.
Figure 7:
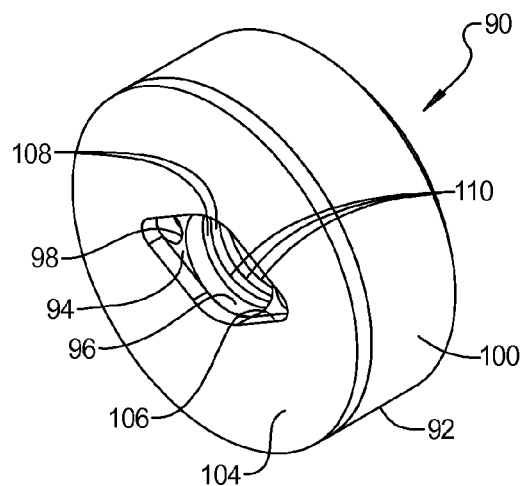
FIG. 7 is a perspective view of a portion of the adjustable friction joint assembly of FIGS. 2 through 5.
Figure 8:
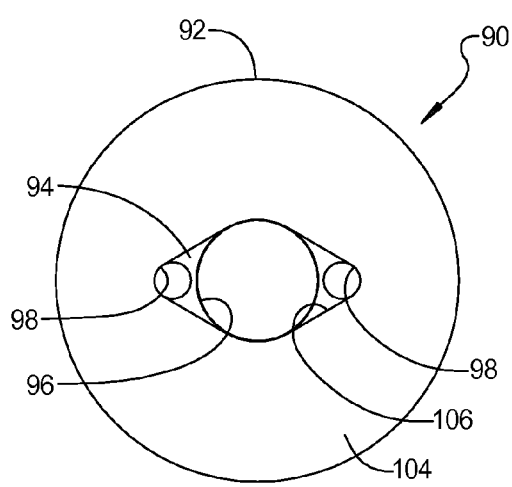
FIG. 8 is a front elevational view of the portion of the adjustable friction joint assembly of FIGS. 2 through 5.
Figure 9:
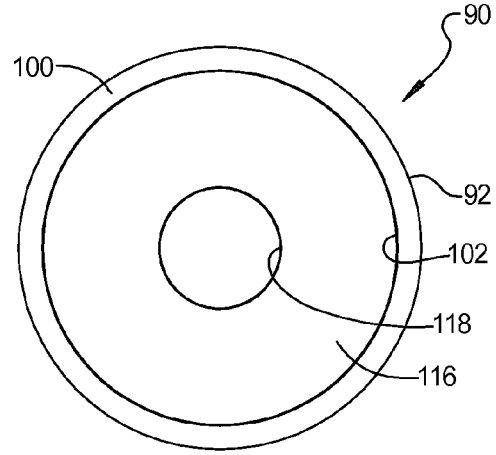
FIG. 9 is a rear elevational view of the portion of the adjustable friction joint assembly of FIGS. 2 through 5.
Figure 10:
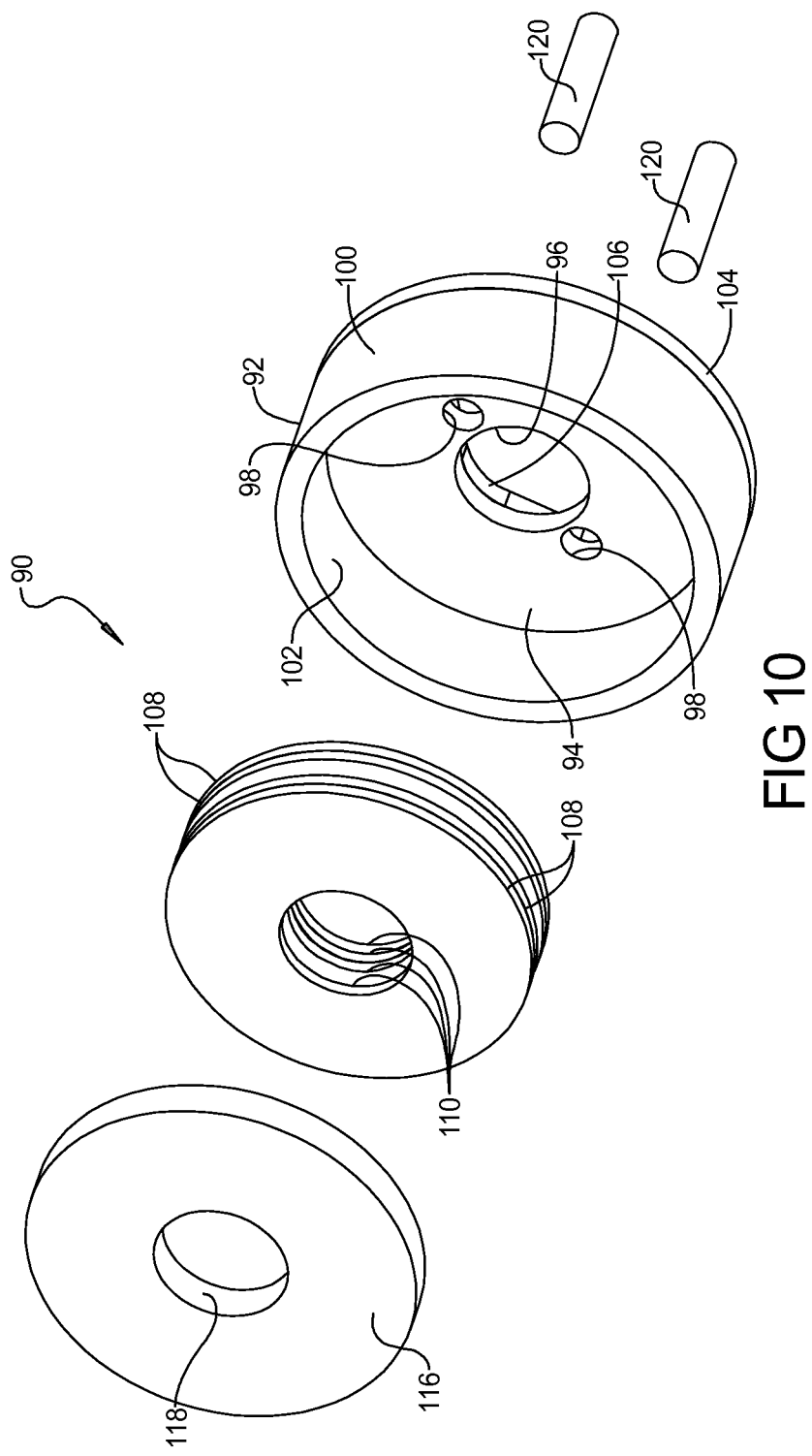
FIG. 10 is an exploded view of the portion of the adjustable friction joint assembly of FIGS. 2 through 5.

Referring to the drawings and in particular FIGS. 1 and 2, one embodiment of an adjustable friction joint assembly 10, according to the present invention, is shown in operational relationship with a crash test dummy, generally indicated at 12. The crash test dummy 12 is of a fiftieth percentile (50%) male type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a spine assembly, generally indicated at 16, having an upper end mounted to the head assembly 12 and a lower end extending into a torso area of the crash test dummy 12. The crash test dummy 12 further includes a pelvis assembly 18 connected to a spine mounting bracket (not shown) of the spine assembly 16.

The torso area of the crash test dummy 12 also includes a rib cage assembly, generally indicated at 20, connected to the spine assembly 16. The crash test dummy 12 also has a pair of arm assemblies including a right arm assembly, generally indicated at 22, and a left arm assembly (not shown), which are attached to the crash test dummy 12. The crash test dummy 12 further includes a right leg assembly, generally indicated at 24, and a left leg assembly, generally indicated at 26, which are attached to the pelvis assembly 18. Each of the leg assemblies 24 and 26 include an upper leg or femur portion 28 and a lower leg or tibia portion 30. It should be appreciated that various components of the crash test dummy are covered in a polyvinyl skin such as a flesh and skin assembly (partially shown) for improved biofidelity of the crash test dummy 12.

Referring to FIGS. 2 through 6, one embodiment of the adjustable friction joint assembly 10, according to the present invention, is shown. In one embodiment, the adjustable friction joint assembly 10 is used for the knee joint to connect upper and lower leg portions 28 and 30 of one of the leg assemblies 24, 26 together. The adjustable friction joint assembly 10 can be used on both the right hand and left hand positions of the crash test dummy 12. In the embodiment illustrated in FIG. 2, one adjustable friction joint assembly 10 is used for the knee joint on the right hand position of the crash test dummy 12. Since the adjustable friction joint assembly 10 is mirrored for each of the right hand and left hand positions of the crash test dummy 12, only one of the adjustable friction joint assembly 10 will be subsequently described. It should be appreciated that the subsequent description of the adjustable friction joint assembly 10 is that same for both the right hand and left hand positions of the crash test dummy 12. It should also be appreciated that the adjustable friction joint assembly 10 that includes an adjustable friction assembly 90 to be described may be used for other joints of the crash test dummy 12 such as shoulders and elbows to resist rotation.

Referring to FIGS. 2 through 6, the adjustable friction joint assembly 10 also includes a first joint member, generally indicated at 34, for connection to either the upper or lower leg portion 28 or 30 of one of the leg assemblies 24, 26. In the embodiment illustrated, the first joint member 34 is connected to the upper leg portion 28. The first joint member 34 has a base portion 36 being circular in shape. The first joint member 34 has a saddle portion 38 extending radially from the base portion 36. The saddle portion 38 has a passage 40 extending therein. The saddle portion 38 includes a pair of side wall members 42 spaced axially from each other and opposing each other to form a space 44 therebetween to receive a portion of the second joint member 56 to be described. Each of the wall members 42 includes a first aperture 46 extending therethrough. The first aperture 46 is generally centrally located. Each of the wall members 40 and 42 includes one or more second aperture 48 extending therethrough and spaced from the first aperture 46. It should be appreciated that the first aperture 46 receives a bearing member 49 therein having a ring shape to receive a shaft 84 to be described.

The first joint member 34 also has a connecting portion 50 extending radially from the base portion 36 for connection to the upper leg portion 28. The connecting portion 50 is generally cylindrical in shape and has a cavity 52 extending radially therein. The connecting portion 50 includes one or more apertures 54 extending transverse thereto and communicating with the cavity 52. The first joint member 34 is made of a metal material and is integral, unitary, and one-piece. It should be appreciated that, in one embodiment, skeletal structure from the upper leg portion 28 is disposed in the cavity 52 of the connecting portion 50 of the first joint member 34 and a suitable mechanism such as fasteners (not shown) extend through the apertures 54 in the connecting portion 50 to secure the first joint member 34 to the upper leg portion 28.

The adjustable friction joint assembly 10 also includes a second joint member, generally indicated at 56, for connection to either the upper or lower leg portion 28 or 30 of one of the leg assemblies 24, 26. In the embodiment illustrated, the second joint member 56 is connected to the lower leg portion 30. The second joint member 56 includes a base portion 58 and a connecting portion 60 extending from the base portion 58 for connection to the lower leg portion 30. The base portion 58 is generally a quarter radius shaped portion having one or more apertures 62 extending axially therethrough. One of the apertures 62 is centrally located in the base portion 58. The base portion 58 also includes a passageway 64 extending therethrough and communicating with the central aperture 62. It should be appreciated that the base portion 58 is disposed between the side wall members 42 of the first joint member 34 and a bearing member 59 may be disposed between the base portion 58 and the side wall members 42.

The connecting portion 60 extends radially from the base portion 58. The connecting portion 60 is generally cylindrical in shape and has a cavity 66 extending radially therein. The connecting portion 60 includes one or more apertures 68 extending transverse thereto and communicating with the cavity 66. The base portion 58 and connecting portion 60 are integral, unitary, and one-piece. The second joint member 58 is made of a metal material. It should be appreciated that, in one embodiment, skeletal structure from the lower leg portion 30 is disposed in the cavity 66 of the connecting portion 60 of the second joint member 56 and a suitable mechanism such as fasteners (not shown) extend through the apertures 68 in the connecting portion 60 to secure the second joint member 56 to the lower leg portion 30.

The adjustable friction joint assembly 10 may include a cap member 70 connected to the second joint member 56. The cap member 70 is generally arcuate in shape with an outer portion 72 and side wall portions 74 extending from the outer portion 72 to form a generally inverted "U" shape. The base portion 58 of the second joint member 56 is received between the side wall portions 74 and the side wall portions 74 are connected to the base portion 58 of the second joint member 56 by a suitable mechanism such as fasteners 76. The cap member 70 is made of a metal material. It should be appreciated that the cap member 70 rotates with the second joint member 56.

The adjustable friction joint assembly 10 may include one or more cover member 78 connected to the second joint member 56. In the embodiment illustrated, the cover members 78 are generally semi-hemispherical in shape. The cover members 78 include one or more apertures 80 extending therethrough. The cover members 78 are connected to the side wall members 42 by a suitable mechanism such as fasteners 82 extending through the apertures 80 and threadably engaging the side wall members 42.

The adjustable joint friction assembly 10 includes a shaft 84 extending through the first joint member 34 and the second joint member 56. The shaft 84 is generally cylindrical in shape and circular in cross-sectional shape. The shaft 84 is made of a metal material. The shaft 84 extends through the centrally located aperture 62 in the base portion 58 of the second joint member 56 and the bearing member 49 and first aperture 46 in the saddle portion 38 of the first joint member 34. The shaft 84 has a cavity 85 extending axially therein to receive a fastener to be described. The shaft 84 is connected to the second joint member 56 by a suitable mechanism such as a fastener 86 extending through the aperture 64 in the base portion 58 of the second joint member 56 and threadably engaging the shaft 84. It should be appreciated that the shaft 84 allows the first joint member 34 and the second joint member to rotate relative to each other. It should also be appreciated that the second joint member 56 and shaft 84 rotate together.

Referring to FIGS. 7 through 10, the adjustable friction joint assembly 10 includes an adjustable friction assembly, generally indicated at 90, connected to the shaft 84 adjacent the side wall 42 of the first joint member 34. The friction assembly 90 includes a first friction member 92. The first friction member 92 has a base wall 94 that is generally circular in shape. The base wall 94 has at least one aperture extending axially therethrough. In the embodiment illustrated, the base wall 94 has a first aperture 96 centrally located therein and one or more second apertures 98 spaced from the first aperture 96. The second apertures 98 have a diameter less than a diameter of the first aperture 96. The first friction member 92 also has a side wall 100 extending generally perpendicular to and circumferentially about the base wall 94 to form a cavity 102 extending axially therein. The cavity 102 has a generally circular shape. The first friction member 92 is made of a metal material. The first friction member 92 is integral, unitary, and one-piece. It should be appreciated that the apertures 96 and 98 in the base wall 94 communicate with the cavity 102.

The adjustable friction assembly 90 also includes a friction plate member 104 disposed adjacent the first friction member 92. The friction plate member 104 is generally circular in shape. The friction plate member 104 has an aperture 106 extending axially therethrough. The aperture 106 is generally diamond shaped and is centrally located. The aperture 106 is of a size sufficient to allow access to the first and second apertures 96 and 98 of the first friction member 92. The friction plate member 104 is made of a friction material. The friction plate member 104 is secured to the first friction member 92 by a suitable mechanism such as an adhesive, for example, epoxy.

The adjustable friction assembly 90 includes one or more springs 108 disposed in the cavity 102 of the first friction member 92. The springs 108 are of a Belleville type. In the embodiment illustrated, there are four springs 108 with two springs 108 stacked upon each other. The springs 108 are generally circular in shape and have at least one aperture 110 extending axially therethrough. The aperture 110 is centrally located in the springs 108. The springs 108 are made of a spring material. It should be appreciated that the springs 108 are disposed in the cavity 102 of the first friction member 92.

The adjustable friction assembly 90 includes a second friction member 116 disposed against one stack of the springs 108. The second friction member 116 is of a washer type. The second friction member 116 is generally circular in shape. The second friction member 116 has at least one aperture 118 extending axially therethrough. The aperture 118 is centrally located in the second friction member 116. The second friction member 116 is made of a metal material. It should be appreciated that the springs 108 are disposed between the first friction member 92 and the second friction member 116, resulting in all the force transferring through them. It should also be appreciated that the second friction member 116 is movable relative to the first friction member 92.

The adjustable friction assembly 90 may further includes one or more guide pins 120 cooperating with the shaft and the first friction member 92 to provides resistance to loosing. The guide pins 120 are generally cylindrical in shape and are disposed in the apertures 98 in the base wall 94 of the first friction member 92 and engage corresponding apertures (not shown) in a cap member to be described. The guide pins 120 are made of a metal material.

Figure 11:
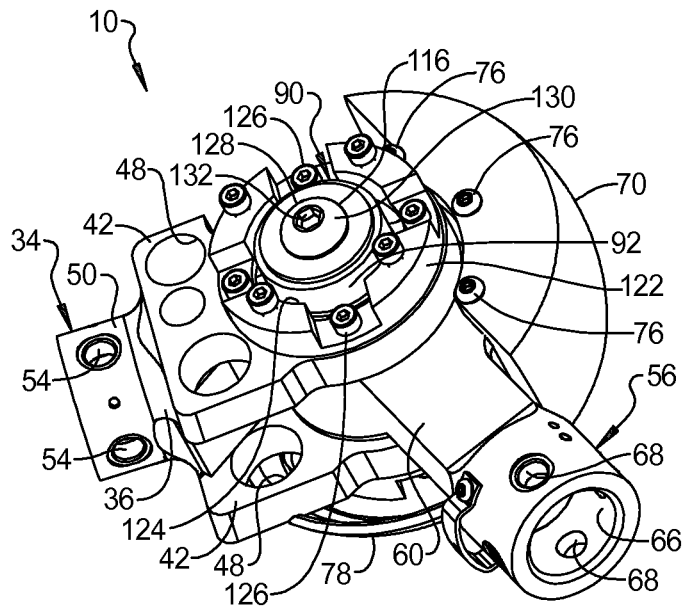
FIG. 11 is a perspective view of the adjustable friction joint assembly of FIGS. 2 through 5 with one cover member removed.
Figure 12:
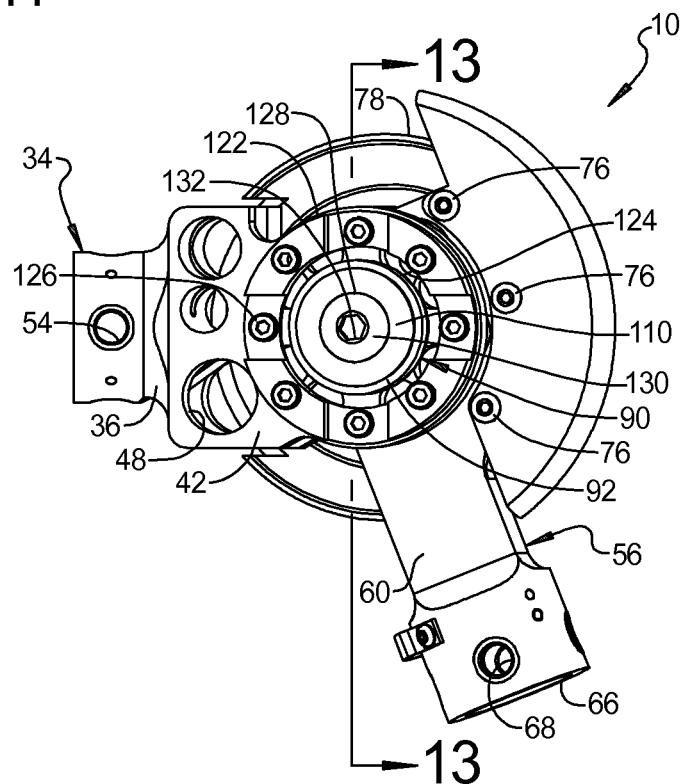
FIG. 12 is a front elevational view of the adjustable friction joint assembly of FIGS. 2 through 5 with one cover member removed.
Figure 13:
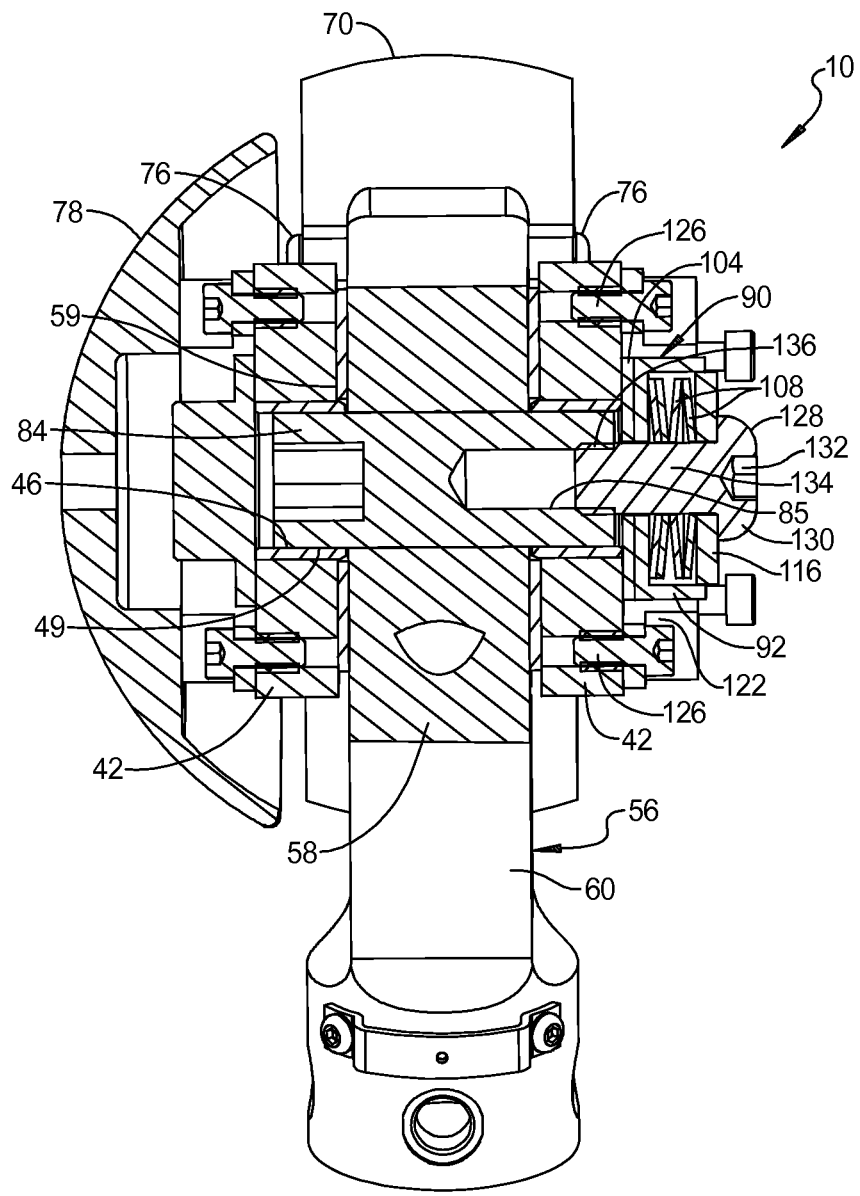
FIG. 13 is an enlarged sectional view taken along line 13-13 of FIG. 12.

Referring to FIGS. 11 through 13, the adjustable friction joint assembly 10 also includes a cap member 122 disposed adjacent the side wall 42 of the first joint member 34 for receiving the adjustable friction assembly 90. The cap member 122 is generally circular in shape and has an aperture 124 extending axially therethrough. The aperture 124 is generally circular in shape and of a size greater than the adjustable friction assembly 90 to allow the adjustable friction assembly 90 to be disposed therein. The cap member 122 is secured to the side wall 42 of the first joint member 34 by a suitable mechanism such as fasteners 126.

The adjustable joint friction assembly 10 further includes an adjustable member 128 cooperating with the adjustable friction assembly 90. The adjustable member 128 is of a fastener type such as a bolt having a head 130 with a cavity 132 to receive a tool (not shown) and a shaft 134 extending axially from the head 130. The shaft 134 extends through the adjustable friction assembly 90 and has a threaded end 136 that threadably engages the cavity 85 in the shaft 84. It should be appreciated that the head 130 abuts the second friction member 116 and may be rotated by a tool disposed in the cavity 132 to move the second friction member 116 axially relative to the first friction member 92.

In operation, the adjustable friction joint assembly 10 provides the joint friction to allow the crash test dummy 12 to hold an initial position and to aid in biofidelic kinematics. The initial position is referred to as a "1 g" adjustment, which is to provide enough resistance to prevent a limb such as an arm assembly 22 or leg assembly 24, 26 from changing position based on its own weight (the "g" in this case referring to gravity). An operator loosens the adjustable friction joint assembly 10 during setup by loosening the adjustable member 128 connected to the shaft 84, and the second friction member 116 provides visual feedback as to the tightness of the joint when its top face is flush with the top face of the first friction member 92. Force is transferred from the tightening of the adjustable member 128 through the second friction member 116 through the springs 108 into the base wall 94 and into the friction plate 104. The springs 108 extend the force-deflection curve, which increases the sensitivity of the adjustment. It should be appreciated that this helps to prevent the adjustable friction joint assembly 10 from locking from tightening the friction adjustment too far.

Accordingly, the adjustable friction joint assembly 10 of the present invention provides a friction joint for the knee joint and introduction of adjustable joint friction to obtain more control. The adjustable friction joint assembly 10 of the present invention provides a mechanical adjustment for tightness adjustment of the joint on the crash test dummy 12. The adjustable friction joint assembly 10 of the present invention provides friction adjustment for increased sensitivity as to tightness of the joint on the crash test dummy 12. The adjustable friction joint assembly 10 of the present invention provides a visual feedback to locate the "1 g" setting from outside the crash test dummy 12 for tightness adjustment of the joint. The adjustable friction joint assembly 10 of the present invention provides the resistance to loosening by the pins 120 for tightness of the joint on the crash test dummy 12. The adjustable friction joint assembly 10 of the present invention can be used not only for the knee joint, but can be used for other joints of the crash test dummy 12, and can be used on the left hand and right hand positions of the crash test dummy 12.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An adjustable friction joint assembly for a crash test dummy comprising:
    a first joint member for connection to a first member of the crash test dummy;
    a second joint member for connection to a second member of the crash test dummy;
    a shaft operatively connected to said first joint member and said second joint member to allow rotation therebetween; and
    an adjustable friction assembly operatively connected to said shaft and operatively cooperating with said first joint member and said second joint member to adjust a friction tightness of said joint assembly, said adjustable friction assembly including a first friction member having a base wall and a side wall extending from said base wall to form a cavity extending therein, at least one spring disposed in said cavity of said first friction member, and a second friction member disposed against said at least one spring and moveable relative to said base wall.

2. An adjustable friction joint assembly as set forth in claim 1 including a friction plate member disposed adjacent said first friction member.

3. An adjustable friction joint assembly as set forth in claim 1 including at least one guide pin cooperating with said shaft and said first friction member to provide resistance to loosing.

4. An adjustable friction joint assembly as set forth in claim 3 wherein said base wall has at least one aperture extending therethrough.

5. An adjustable friction joint assembly as set forth in claim 4 wherein said at least one guide pin is disposed in said at least one aperture in said base wall of said first friction member and adapted to engage a corresponding aperture in a cap member.

6. An adjustable friction joint assembly as set forth in claim 1 including an adjustable member cooperating with said adjustable friction assembly.

7. A knee joint assembly for a crash test dummy comprising:
    a first joint member for connection to an upper leg portion of the crash test dummy;
    a second joint member for connection to a lower leg portion of the crash test dummy;
    a shaft operatively connected to said first joint member and said second joint member to allow rotation therebetween; and
    an adjustable friction assembly operatively connected to said shaft and operatively cooperating with said first joint member and said second joint member to adjust a friction tightness of said joint assembly, said adjustable friction assembly including a first friction member having a base wall and a side wall extending from said base wall to form a cavity extending therein, at least one spring disposed in said cavity of said first friction member, and a second friction member disposed against said at least one spring and moveable relative to said base wall.

8. A knee joint assembly as set forth in claim 7 including a friction plate member disposed adjacent said first friction member.

9. A knee joint assembly as set forth in claim 7 including at least one guide pin cooperating with said shaft and said first friction member to provide resistance to loosing.

10. A knee joint assembly as set forth in claim 7 including an adjustable member cooperating with said adjustable friction assembly.

11. An adjustable friction joint assembly for a crash test dummy comprising:
    a first joint member for connection to a first member of the crash test dummy;
    a second joint member for connection to a second member of the crash test dummy;
    a shaft operatively connected to said first joint member and said second joint member to allow rotation therebetween;
    an adjustable friction assembly operatively connected to said shaft and operatively cooperating with said first joint member and said second joint member to adjust a friction tightness of said joint assembly; and said adjustable friction assembly comprising a first friction member having a cavity, a plurality of springs disposed in said cavity, a friction material member disposed between said first friction member and said first joint member, a second friction member disposed adjacent said springs and movable relative to said first friction member, and an adjustable member extending through said second friction member, said springs, said first friction member, and said first material member and engaging said shaft to move toward and away from said springs to adjust a friction tightness of said joint assembly.

12. A crash test dummy comprising:

a body;

at least one assembly operatively attached to said body;

an adjustable friction joint assembly operatively attached to said body and said at least one assembly and comprising a first joint member connected to said body;

a second joint member for connection to said at least one assembly;

a shaft operatively connected to said first joint member and said second joint member to allow rotation therebetween; and an adjustable friction assembly operatively connected to said shaft and operatively cooperating with said first joint member and said second joint member to adjust a friction tightness of said joint assembly, said adjustable friction assembly including a first friction member having a base wall and a side wall extending from said base wall to form a cavity extending therein, at least one spring disposed in said cavity of said first friction member, and a second friction member disposed against said at least one spring and moveable relative to said base wall.

13. A crash test dummy comprising:

a body having a leg comprising an upper leg portion and a lower leg portion;

a knee joint assembly operatively attached to said upper leg portion and said lower leg portion and comprising a first joint member connected to said upper leg portion;

a second joint member connected to said lower leg portion;

a shaft operatively connected to said first joint member and said second joint member to allow rotation therebetween; and an adjustable friction assembly operatively connected to said shaft and operatively cooperating with said first joint member and said second joint member to adjust a friction tightness of said joint assembly, said adjustable friction assembly including a first friction member having a base wall and a side wall extending from said base wall to form a cavity extending therein, at least one spring disposed in said cavity of said first friction member, and a second friction member disposed against said at least one spring and moveable relative to said base wall.

14. A crash test dummy comprising:

a body;

at least one assembly operatively attached to said body;

an adjustable friction joint assembly operatively attached to said body and said at least one assembly and comprising a first joint member connected to said body and a second joint member connected to said at least one assembly;

a shaft operatively connected to said first joint member and said second joint member to allow rotation therebetween;

an adjustable friction assembly operatively connected to said shaft and operatively cooperating with said first joint member and said second joint member to adjust a friction tightness of said joint assembly; and said adjustable friction assembly comprising a first friction member having a cavity, a plurality of springs disposed in said cavity, a friction material member disposed between said first friction member and said first joint member, a second friction member disposed adjacent said springs and movable relative to said first friction member, and an adjustable member extending through said second friction member, said springs, said first friction member, and said first material member and engaging said shaft to move toward and away from said springs to adjust a friction tightness of said joint assembly.

* * * * *